United States Patent
Tonchev et al.

(12) 
(10) Patent No.: US 6,324,570 B1
(45) Date of Patent: Nov. 27, 2001

(54) PRIORITIZED DELIVERY AND CONTENT AUTO SELECT SYSTEM

(75) Inventors: Theodore G. Tonchev, Cambridge; Hiroshi Kobata, Brookline, both of MA (US)

(73) Assignee: e-Parcel, LLC, MA (US)

( * ) Notice: Subject to any disclaimer, the term of this patent is extended or adjusted under 35 U.S.C. 154(b) by 0 days.

(21) Appl. No.: 08/805,443

(22) Filed: Feb. 25, 1997

(51) Int. Cl.$^7$ ............................ G06F 15/46; G06F 15/173
(52) U.S. Cl. .............................................. 709/207; 709/240
(58) Field of Search .................... 395/200.33, 200.37, 395/200.54, 200.55, 200.7, 200.72, 200.74, 673; 709/200, 207, 224, 225, 240, 242, 244, 204, 4, 238

(56) References Cited

U.S. PATENT DOCUMENTS

| | | | |
|---|---|---|---|
| 5,369,570 | * 11/1994 | Parad .................................. | 364/401 |
| 5,440,719 | * 8/1995 | Hanes et al. ......................... | 395/500 |
| 5,586,219 | * 12/1996 | Yufik .................................... | 395/20 |
| 5,619,647 | * 4/1997 | Jardine ........................... | 395/200.01 |
| 5,623,413 | * 4/1997 | Matheson et al. .................... | 364/436 |
| 5,694,548 | * 12/1997 | Baugher et al. ................ | 395/200.12 |
| 5,737,747 | * 4/1998 | Vishlitzky et al. .................. | 711/118 |
| 5,742,772 | * 4/1998 | Sreenan ........................... | 395/200.56 |
| 5,829,046 | * 10/1998 | Tzelnic et al. ....................... | 711/162 |
| 5,920,700 | * 7/1999 | Gordon et al. ................. | 395/200.56 |

* cited by examiner

*Primary Examiner*—Glenton B. Burgess
*Assistant Examiner*—Tod Kupstas
(74) *Attorney, Agent, or Firm*—Fish & Richardson, PC

(57) ABSTRACT

A system is provided to deliver complete files from a server to a maximum number of clients, while at the same time minimizing cumulative waiting time through the utilization of a prioritization heuristic in which there are two competing priorities. As to the first priority, the highest priority is given to those clients most in danger of not receiving a complete file by a predetermined deadline. The second priority is set to minimize the waiting time for the delivery of files by sending the files only to those clients that are capable of receiving the data fastest. An exponential curve system is utilized as a tie breaker between the two competing priorities in which the weight of each priority is determined. As a result, in terms of distribution from a single server to multiple clients, the calculation of the weighted priority is a real number derived from user parameters such as log-in characteristics, the due date, and the amount of the file remaining to be transmitted. The characteristics of the client are derived through information sent back to the server from each client with the average throughput to the particular client being calculated either at the client side or by the server itself.

8 Claims, 3 Drawing Sheets

PRIORITIZED DELIVERY AND CONTENT AUTO SELECT SYSTEM

FIELD OF INVENTION

This invention relates to prioritized delivery of information from a server to multiple clients and more particularly to a system which assures that all files will be delivered on time while at the same time minimizing waiting time for each individual client.

BACKGROUND OF THE INVENTION

As is often the case, a server is to deliver files to a multiplicity of clients. One of the bottlenecks to the efficient and complete transfer of large files from a server to a particular client, has to do with the bandwidth of the connection of the server to the network and the connection to each of the clients which also has a limiting bandwidth associated with it.

For instance, if a server has a relatively large file on the order of 10–100 megabytes, as is oftentimes the case, bandwidth constraints limit the simultaneous multicasting of this information to all of the clients. This means that the information must be sent to different clients at different times, meaning that only certain clients will be permitted to receive data at any given time. The problem is that the server may be unable to accommodate all clients at once. Moreover, while the server may be able to accommodate all the clients, it may not be able to make certain that a complete file will arrive by a certain due date. This means that the delivery of the information is not possible on a timely basis to all clients.

It is also a factor that not all the clients are on-line at any given time, so that attempting to send information to these clients results in wasted bandwidth.

The situation described above has become acute in view of the growth of so-called "push" technologies in which the server directly downloads to a particular client as opposed to receiving a request from a client. As a result, in the case of a single server which multicasts its data to a number of clients, the bandwidth of the server connection to the net and the bandwidth of the switch to the various clients are both limiting factors.

SUMMARY OF THE INVENTION

In order to accomplish efficient and robust delivery of large files from a single server to multiple clients, in the subject invention, the distribution of the information is prioritized such that clients are selected based on their ability to receive the information in a quick and efficient manner and also on the time left to meet a predetermined deadline for the transmission of the file. In one embodiment, the highest priority is given to those clients that are most in danger of not receiving an entire file by the predetermined deadline. On the other hand, priority is also given to minimize waiting time for a client by sending the information first to those clients having the fastest processors or, in general, the fastest network connection. For instance, for a client connected to the network at only 14 kilobytes per second, the connection is relatively slow. Thus initially those clients having connection speeds of 28.8 kilobytes or better are given priority.

Initially, the connection bandwidth priority dominates since the data transmission is routed to the faster connections. However, as time goes by, the deadline for the transmission of a file also approaches for clients having lower speed connections. At this point in time, it is necessary to download the file to those clients which are most in danger of the deadline not having been met.

An exponential curve-based algorithm is utilized to decide when, after initial transmission, the priorities are to be reset so as to assure that the slower connections will nonetheless have the file transmitted before the deadline.

It will be appreciated that the reason to give the highest initial priority to the fastest connections is to minimize the overall waiting time for the receipt of the information. If this was the only routine criteria, then only those clients having the faster connections would ever receive the complete files.

The uncertainty as to whether or not a complete file will in fact arrive on time is complicated by the log-in patterns of the various clients. As mentioned hereinbefore, it is of no utility to transmit data to a client who is off-line. Moreover, it is useful to consider the pattern of how long a client stays logged on once he has logged on in order to get an estimate of the probability of a successful transfer. Obviously, for those clients who stay logged on for a long period of time once they log on, the probability of a successful transfer increases, whereas for those clients who not only log-on infrequently, but then do not stay on-line, the probability for a transfer decreases.

For example, for those clients that log on frequently even though the log-on is for a short duration, assuming, for instance, a duty cycle of half, then the probability of a complete transfer to this client would be relatively high. On the other hand, a client that has the self-same one half duty cycle, but logs-on infrequently, depending on the time at which he is caught within his particular cycle, the result may be the inability to meet the deadline. Thus, for instance, even though in the second case the client logs on for four days and logs off for four days, indicating a long log on duration and a relatively high probability of successful transfer, if one attempts to transfer a file at the end of the four day period, the likelihood of a complete transmission is below that which would be associated with a one half cycle frequent user.

In order to calculate the probability of delivery, one assumes a normal distribution of the log-in duration of a user. The first step is to calculate the expected amount of time of the user's availability until the deadline, based on user's duty cycle and the average log-in duration.

More particularly, one calculates the distribution of the period that the user is expected to be logged-in until the deadline, which combined with the average throughput, allows one to calculate the probability of delivery.

Having derived the distribution curve, it is possible by inspection of the curve to ascertain beyond what point it would be impossible to effectuate the delivery and thus calculate the probability of success.

More specifically, files to be transmitted are coupled to a dispatch module which through the read-out of a statistics module are routed to the appropriate client. A priority evaluation model controls the dispatch model as to which clients are to receive the files at which time. The statistics module collects the statistics about a user based on past connections with the past connections, including average connection time, average log-in duration, average throughput and corresponding standard deviations. The average connection time or log-in duration refers to the average amount of time spent on-line, e.g. the average length of the log-in period. On the other hand, the average throughput refers to the average amount of data per second that can be sent to that particular client. The corresponding standard deviations refer to the standard deviations of these distributions. In the priority evaluation module, for each transfer of a File F with certain characteristics such as size of the file remaining to be transferred and the deadline for delivery, the priorities and their relationships are determined.

The result is provided to the dispatch module which determines which clients are to be serviced at any given point in time.

The result is a system which assures that data will be delivered on time to the maximum number of clients, while at the same time minimizing overall waiting time.

BRIEF DESCRIPTION OF THE DRAWINGS

These and other features of the subject invention will be better understood taken in conjunction with the Detailed Description in conjunction with the Drawings of which.

DETAILED DESCRIPTION

Figure 1:
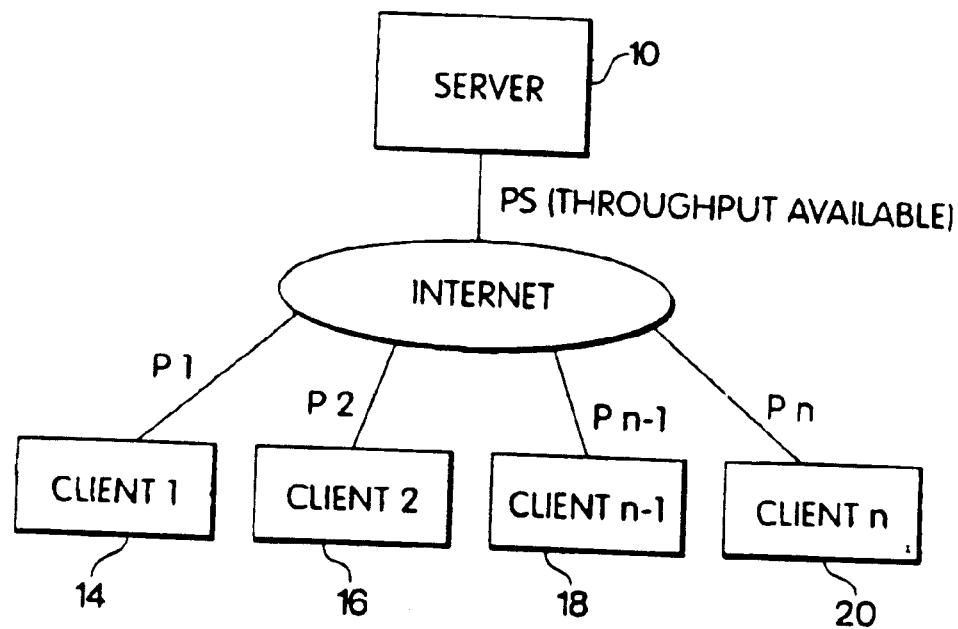
FIG. 1 is a block diagram of a system for transmitting files over a network to multiple clients simultaneously assuming adequate bandwidth.

By way of further background and referring now to FIG. 1, a server 10 is shown connected to a network, namely the Internet 12, which in turn connects server 12 to clients 1-N, here illustrated at 14, 16, 18 and 20. As described hereinabove, if throughput is available to these clients and the bandwidth is not exceeded, then there is no decision that needs to be made as to the prioritization of content delivery by server 10 to the clients.

Figure 2:
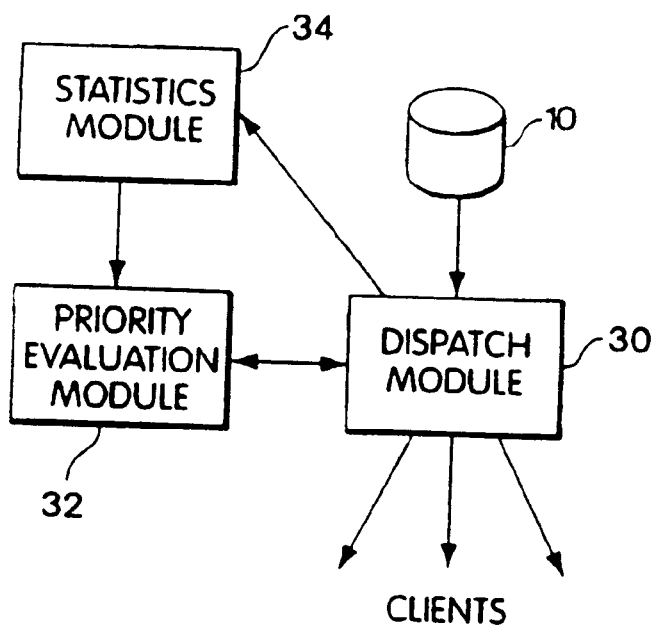
FIG. 2 is a block diagram of a dispatching system for use in the system of FIG. 2 where client log-in history and throughput are taken in consideration in the decision-making process.

Referring now to FIG. 2, if it is impossible to transmit the contents to the various clients due to bandwidth limitations, then it is important to be able to dispatch the contents to those clients on some reasonable basis which minimizes waiting time, while at the same time guaranteeing that a particular file will be delivered to a particular client prior to some deadline. The transmission to the clients is governed by a dispatch module 30, which takes information from a priority evaluation module 32 in order to make a decision as to which clients to route the particular file. Priority module 32 is connected to a statistics module 34, which garners information about each of the clients such as log-in history and throughput for each client. Having the log-in history as well as the throughput to a particular client, priority evaluation module provides a priority rank to each of the clients based on the aforementioned dual distribution curve system. How this is accomplished, is now described.

Figure 3:
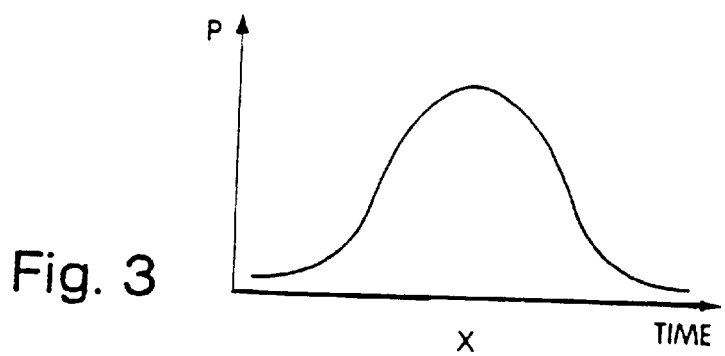
FIG. 3 is a graph of a distribution curve of the expected amount of time a client is active until a predetermined deadline for receipt of a file by this client.

In order to establish the first of the two probabilities that go into making the priority decision, and referring now to FIG. 3, a distribution curve is shown which illustrates how to derive the first of the probabilities, $Probability_1$, utilized in making a decision as to what clients will be serviced. In the graph of FIG. 3, the curve describes the expected amount of time the client is active until the deadline.

Figure 4:
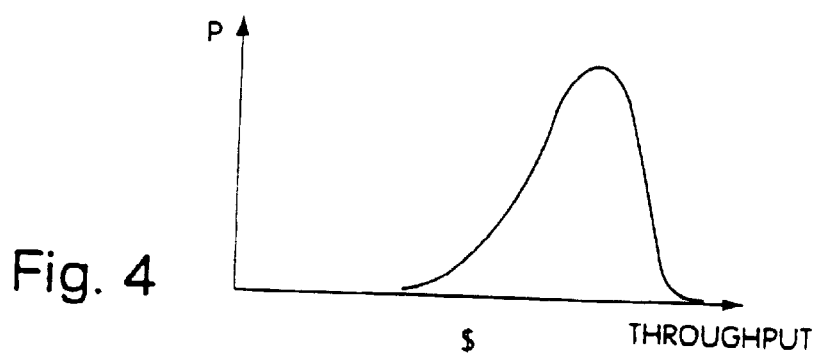
FIG. 4 is a graph of a distribution curve that graphs throughput against probability for a given client.

Referring to FIG. 4, this curve graphs throughput against probability to provide a distribution of the throughput to the particular client from the server.

Figure 5:
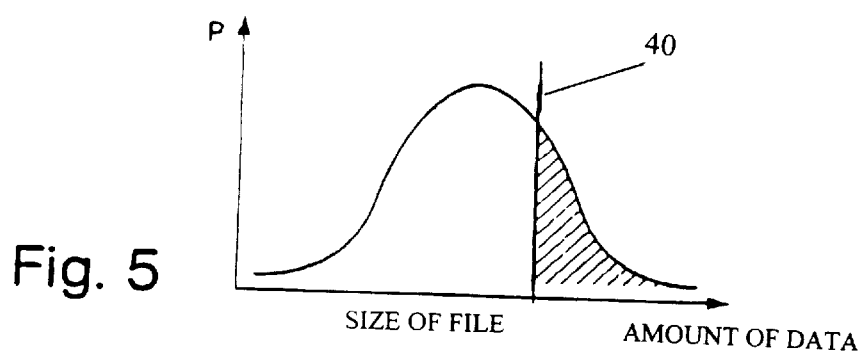
FIG. 5 is a graph of a distribution curve combining the distributions of FIGS. 3 and 4.

Referring to FIG. 5, the two distribution curves of FIGS. 3 and 4 are combined into a curve that relates to the data that can be sent to the particular client up to the point that the deadline is reached. For a given size of file as indicated by line 40, that area to the right of this line is the probability that the file will be delivered before the deadline. This constitutes the basis of the first probability.

The second criteria for the dispatch of contents to a particular client is the inverse of the time necessary to deliver the file to a given client given his throughput. This number is designated $Probability_2$.

Figure 6:
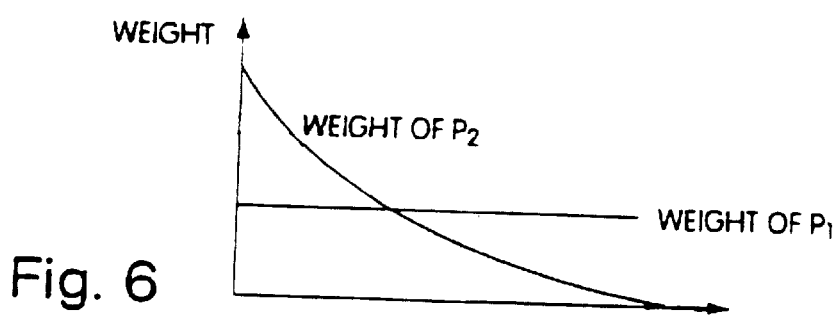
FIG. 6 is a graph of weights given to the probabilities derivable from the distributions shown in FIGS. 3 and 4; and, FIG. 7 is a flow chart for the dispatch module of FIG. 2.

Referring now to FIG. 6, this graph specifies the weight to be given to $Priority_1$ and $Priority_2$ described above. The weight given to $Priority_1$ is a constant, whereas the weight given to $Priority_2$ varies with time in an exponential fashion such that the weight given to the priority relating solely to throughput decreases as time moves on towards the deadline.

More specifically, in order to ascertain the point at which one selects transfer to those clients instead of being the fastest, those being those in most need of a transmission before a deadline, one first needs to calculate the probability that given a particular log-in history for a client, a data file of a predetermined size will be delivered before the deadline. This revolves itself around the combining of two distribution curves, the first of which reflecting the expected time the client will be logged in until such time as the deadline is reached. The second distribution curve is a distribution curve of the throughput to the particular client. Combination of these two distribution curves yields a third distribution curve, which is the maximum amount of data that can be sent to the client until such time as the deadline is reached.

The first probability is therefore the area under the curve from the point that indicates the size of the data file to be transmitted. The probability thus derived is the probability that the file will in fact be delivered by the deadline.

The second probability which is taken into consideration as to which clients are to receive the data at what time is the inverse of the time necessary for delivery of a file of a given size for a client given his throughput.

Consideration of these two probabilities is required in order to make a decision as to which client to deliver a file of a given size, with the decision being made through a weighting system in which the weight of the first probability is constant over time, whereas the weight of the second probability decreases in the exponential fashion. What this means is that the constant weight is given to the probability that a file will be delivered based on the log in history of a particular client, whereas the weight associated with speed with which a client can receive information is made to decrease with time, thereby decreasing in importance the probability of faster connection clients as time goes on towards the deadline. The priority given to a particular client is thus the sum of the weighted priorities, with those clients having a higher priority being served first. What this prioritization system does is to favor initially the faster connected clients, while in the end giving priority to those clients that are in need of the file before the deadline. As a result, as one approaches the deadline, the speed of the connection to a given client is virtually meaningless for the decision making process.

In the procedures that follow, the distributions used must be determined experimentally/statistically for best results. For simplicity, one could use standard distributions that approximate the actual ones (e.g. Gauss normal distribution).

Definition of Terms:

$t_d$=time of deadline $t_c$=current time $S_c$=standard deviation of amount of time that the client will spend logged-in until the deadline $M_c$=is the mean of the amount of time that the client will spend logged-in until the deadline If the client is not logged in, one can approximate the amount of time he will spend logged in until the deadline to have a mean $m_c=(t_d-t_c)r$ and a standard deviation $S_c=(t_d-t_c)q$.

If the client is currently logged in, the mean time he would spend on-line until the deadline also depends on the amount of time he has already spent connected during his current session. Assuming a probability density function fl describing the client's log-in period distribution, then the mean of the time after which the client will interrupt the current session would be:

$$M_p = \frac{\int_{t_o}^{t_d-t_c+t_o} f_1(t) \cdot t \cdot dt}{\int_{t_o}^{t_d-t_c+t_o} f(t) dt}$$

Given this, the client's expected time on-line until the deadline can be approximated as:

$$M_c = M_p + \left(t_d - \frac{(m_p + t_o)}{r} + M_p\right) r$$

Where r is the expected percentage of log-in time.

The amount of time needed for the server to transfer a file of size S to the client will be a distribution with mean $M_t$ and standard deviation $S_t$. Then, the probability that C<T (where C is a random variable with $M_c$ and standard deviation $S_c$ and T is a random variable with $M_t$ and standard deviation $S_t$) is the probability $P_d$ that a file can be delivered to the client by the server before the given deadline. Here $P_d$ is the probability that C<T. Thus, one sets the first priority to:

$$P_1 = e^{-\left(P_d^{-\frac{1}{2}}\right)^2}$$

The second priority, $P_2$, indicates how quickly a file can be delivered to a client, and as such it is set to:

$$P_2 = \frac{1}{S(M_v)}$$

where S is the remaining data to be transferred and $M_v$ is the expected value of the throughput to the client.

The arbitration between the two priorities is performed by weighing each of them differently depending on the time until the deadline. The ratio of the weights decreases exponentially as one approaches the deadline, so that the first priority becomes more important with time. The total priority is thus calculated by:

$$P = k_1 P_1 + \left(e^{-\frac{k_2}{t_d-t}}\right) P_2$$

where $k_1$ determines the initial ratio of importance of the two factors, while $k_2$ determines the rate of change.

Note that P is the priority of a given user; and it is on this number that a decision to transmit is made.

What is provided is a system for making a decision as to which clients receive a large data file at what time. In order to accomplish this, server 10 is provided with the large file. Dispatch module 30 is employed to dispatch the contents of this file amongst clients whose log-in characteristics and connection speeds are known in advance. This knowledge can be obtained by priority evaluation module 32 through a demographics system, which can be accomplished through a system which queries the infrastructure of the client's connection and provides a database corresponding to the demography of the client.

Alternatively, statistics module 34 may be provided to accumulate data from the previous connections for the particular client to provide a historic usage of the client as to log in history and throughput. Throughput is fairly easy to establish through a system which observes the amount of data that a server has managed to send to a particular client in a predetermined period of time prior to the time in question. In short, whenever a file is sent to a particular client, statistics can be maintained as to the throughput distribution of that client.

Moreover, the client's software records the log-in history of the particular client and transmits this information to the server. The server then analyzes the incoming information and calculates the two above-mentioned distributions of the log-in history. Based on the results and probabilities, the weights are assigned and a number is generated indicating the priority for a given client. This number is coupled to the dispatch module which then dispatches the contents to the client based on the aforementioned priority.

As to dispatch module 30, the complexity associated with this module revolves around the fact that the clients may not be constantly active. Basically, what happens is that the server supports a number of connections to the highest ranked currently active clients. If a client having an even higher priority connects to the system, the connections to the lowest ranking currently logged on clients are interrupted in order to allow for a connection to the newly logged in client. The necessity of this selection process is based on the limited output throughput available to the dispatch module.

Assuming that one can send only 1 megabit per second, only 40 connections of 28.8 bits per second user can be supported at any one time. Thus, if another user connects to the system and this user has higher priority than some of the other users currently connected, then the connection to some of these users will have to be dropped in favor of the higher ranked user, due to the limited throughput capabilities. Thus, the dispatch module, while capable of acting on the priority number generated, must nonetheless respond to other criteria so that certain client connections are dropped to favor a newly active client. It will be appreciated that the newly connected client, also has associated historical characteristics of log in and throughput which establishes this newly connected client as one having a higher priority. In this case, the priority established through the subject prioritization system is detected by the dispatch module and the new client is placed into the preexisting priority scenario, however, based on its own demographics.

Figure 7:
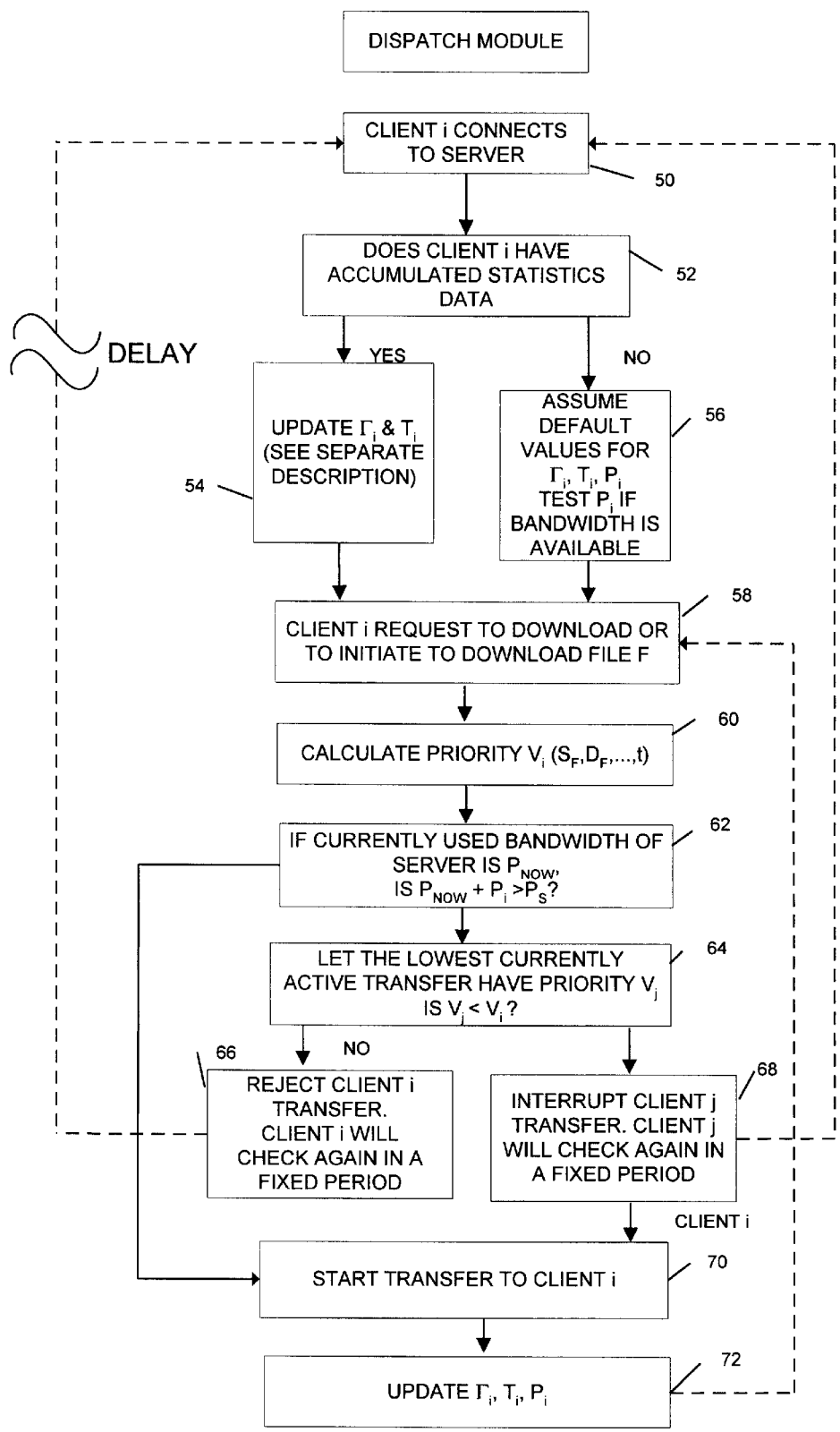

Referring now to FIG. 7, as to dispatch module 30, in one embodiment client$_i$ connects to the server as shown at 50. The first step executed in the dispatch module is to decide whether client$_i$ has accumulated statistics data as shown at 52. If so, as shown at 54, the two log-in distributions are updated giving the newly available log-in information.

If client$_i$, as shown at 56, has no accumulated statistics data, then one assumes default values for these two distributions. At this point, the server tests the available throughput to the client assuming bandwidth is available. The test, in one sense, is a preliminary calculation of the throughput distribution.

Regardless as to which way these two distributions are derived, as shown at 58, client$_i$ requests to download or to continue to download the particular file. Thereafter, as shown at 60, the dispatch module utilizes the priority evaluation module to calculate the priority of this client. Thereafter, as shown at 62, if there is enough available bandwidth for this particular client, the server starts sending the file to this new client, as shown at 70, with an update being indicated at 72. This is indicated by a signal on the NO line.

On the other hand, as shown at 64, if there is no available bandwidth, a dispatch module checks to see if there are lower ranked clients that are currently receiving data. If such clients exist, then, as shown at 68, their connection is interrupted and the free bandwidth is used for the newly logged on client.

If, as shown at 66, all currently connected clients have higher priorities than the newly connected client, client$_i$, the server rejects the client and asks the client to check again in a short period of time.

During the transfer of data to client$_i$, the dispatch module sends statistics data to the statistics module describing the throughput and log in properties of client.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A system for distributing a file to a plurality of clients over a network, said system comprising:
    a dispatch module transmitting a copy of said file to each of said clients in a prioritized order determined in response to a respective time by which each respective client of said plurality of clients is to receive said copy of said file, a respective availability of each client of said plurality of clients, and a respective throughput of each client of said plurality of clients; and
    a calculator calculating a first probability and a second probability that said copy of said file will be delivered to a given client before said time,
    wherein said first probability that said file will be delivered before said time is calculated in response to a first distribution curve and a second distribution curve,
    wherein said first distribution curve is the expected amount of time that the given client will be active until said time, and
    wherein said second distribution curve is the distribution of throughput to the given client.

2. The system of claim 1 wherein said second probability is calculated in response to an inverse of a time necessary to deliver said copy of a file to each client for the respective throughput of each said client.

3. The system of claim 1 wherein said first probability has a constant weight and said second probability has an exponentially decreasing weight with time, and wherein said dispatch module determines which client of said plurality of clients to transmit said file in response to a combination of said weighted probabilities.

4. A method for delivering a file from a server to a plurality of client over a network, comprising:
    determining a time by which each client of said plurality of clients is to receive said file;
    determining an availability of each client of said plurality of clients;
    determining a throughput of each client of said plurality of clients;
    transmitting said file to said plurality of clients in a prioritized order determined in response to said time by which each client of said plurality of clients is to receive said file, the respective availability of each client of said plurality of client, and the respective throughput of each client of said plurality of clients; and
    calculating a first probability and a second probability that said file will be delivered to each client before said time,
    wherein said first probability that said file will be delivered before said time is calculated in response to a first distribution curve and a second distribution curve,
    wherein said first distribution curve is the expected amount of time that each client is active until said time, and
    wherein said second distribution curve is the distribution of throughput to said client.

5. The method of claim 4 wherein said second probability is calculated in response to an inverse of a time necessary to deliver said file to each client for the respective throughput of each client.

6. The method of claim 4 wherein said first probability has a constant weight and said second probability has an exponentially decreasing weight with time, the method further comprising determining the prioritized order using a combination of said weighted probabilities for each client.

7. A method for distributing a file from a server to a plurality of clients over a network, comprising:
    determining a deadline by which time each of the clients is to receive a copy of the file,
    determining a throughput for each of the clients at which the server can transmit the copy of the file to that client;
    computing a priority value for each of the clients from the deadline and the throughput to that client; and
    transmitting the copy of the file to each of the clients in an order determined by the priority values computed for each of the clients,
    wherein a higher priority value is initially computed for a first one of the clients than for a second one of the clients when the throughput to the first one of the clients is faster than the throughput to the second one of the clients, and
    wherein the priority value of the second one of the clients increases relative to the priority value of the first one of the clients as the time remaining until the deadline decreases.

8. A method for distributing a file from a server to a plurality of clients over a network, comprising:

determining a deadline by which time each of the clients is to receive a copy of the file;

determining a throughput for each of the clients at which the server can transmit the copy of the file to that client;

computing a priority value for each of the clients from the deadline and the throughput to that client;

transmitting the copy of the file to each of the clients in an order determined by the priority values computed for each of the clients;

detecting a new client on the network in communication with the server;

determining that sufficient bandwidth is currently unavailable to transmit the copy of the file to the new client;

computing a priority value for the new client;

interrupting communication between the server and one of the clients having a lower priority value than the new client; and initiating transmission of the copy of the file to the new client.

\* \* \* \* \*